Figure 1:
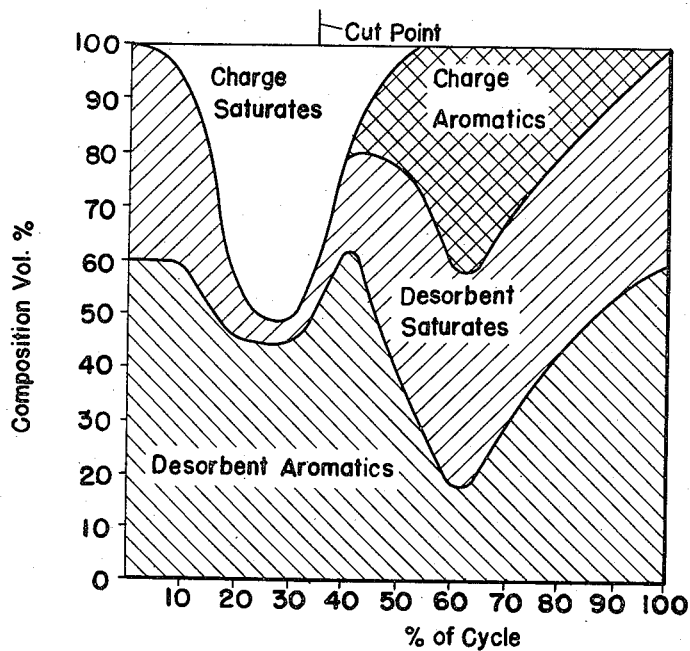

Sept. 30, 1958     J. VAN D. FEAR     2,854,495

RECONSTITUTING DESORBENT IN AN ADSORPTION PROCESS

Filed July 18, 1955

INVENTOR.
JAMES V. D. FEAR
BY
ATTORNEY

2,854,495
RECONSTITUTING DESORBENT IN AN ADSORPTION PROCESS

James Van Dyck Fear, Upper Providence, Pa., assignor to Sun Oil Company, Philadelphia, Pa., a corporation of New Jersey Application July 18, 1955, Serial No. 522,757

2 Claims. (Cl. 260—674)

This invention relates to a process for the selective adsorption of aromatic hydrocarbons from composite liquid hydrocarbon mixtures, in which the adsorbent is alternately contacted with a hydrocarbon feed and with a desorbent liquid, and is particularly directed to a method for maintaining the constitution of the desorbent liquid.

Commercial processes for the separation of aromatics of high purity from petroleum stocks comprising a mixture of aromatics and saturates, by adsorption on silica gel or other suitable adsorbent, have recently been developed, such as the "Arosorb" process described in Petroleum Refiner, vol. 31, No. 5, pages 109–113 (May 1952 issue). In general, such processes comprise passing a hydrocarbon charge containing aromatics over an adsorbent such as silica gel or charcoal, on which the aromatics are preferentially adsorbed, until the capacity of the adsorbent for aromatics has been substantially exhausted, after which a desorbent which boils outside the boiling range of the charge, either higher or lower, depending on the character of the charge, is passed through the adsorbent in order to desorb the charge aromatics and condition the adsorbent for treatment of an additional quantity of fresh charge. The desorbent is preferably also a mixture of aromatics and saturates. The aromatics are provided to effect desorption of the charge aromatics from the adsorbent, while the saturates are present mainly to provide a wedge of desorbent saturates between the charge aromatics and the charge saturates, as they issue from the adsorbent, to effect a more perfect separation between these components. Preferably the desorbent will contain 40–80% aromatics, since only 20–60% saturates are required to provide such a wedge, and the higher the concentration of aromatics in the desorbent, the less total desorbent is needed to effect the desorption of charge aromatics from the adsorbent. It is possible, however, to operate the process using a desorbent which comprises 30% aromatics, or less, but the separation of charge aromatics and saturates will be poorer.

Normally, the desorbent should have a boiling range such that an efficient separation of charge components and desorbent components may be effected in a fractional distillation column with a minimum of theoretical plates. For this reason it is customary to select a desorbent which has a boiling range at least about 40° F. away from the nearest boiling component of the charge keping in mind that desorbent viscosity should be low. For example, if the charge contains benzene and saturates of similar boiling points, the desorbent preferably comprises a crude xylene mixture containing about 65% xylenes, whereas if the charge is higher boiling, such as, for example, a 300°–400° cut of motor reformate which it is desired to process for the recovery of aromatic solvents, the desorbent is preferably a hydrocarbon fraction containing about 60% benzene, the balance being saturates boiling within the range of say 160°–190° F.

Fig. 1 of the accompanying drawing is an effluent diagram of an adsorption process treating a 300°–400° F. charge containing about 50% aromatics. The charge was prepared by fractionation of the product obtained by hydroforming a 250°–400° F. fraction of straight-run naphtha. The desorbent was a 160°–190° F. fraction containing 60% benzene. In each cycle of operation, charge was passed through a bed of silica gel in the amount of 0.0405 gallon of charge per pound of gel in the bed, followed by desorbent in the amount of 0.12 gallon per pound of gel. As may be seen from the drawing, the first fraction issuing from the adsorbent bed during each cycle, and amounting to about 45 percent of the total effluent, will comprise charge saturates, desorbent saturates, and desorbent aromatics. This fraction is collected and is passed to a fractionating column, in which desorbent components are taken overhead, while a saturate product containing but 3.2% aromatics is withdrawn as bottoms. The second fraction issuing from the adsorbent bed during each cycle, and constituting about 55 percent of the total effluent, will comprise charge aromatics, desorbent aromatics, and desorbent saturates. This fraciton is likewise separately collected and passed to a second fractionating tower, from which desorbent components are recovered overhead, while an aromatic solvent containing less than 3% saturates, is recovered as bottoms. The overhead from each fractionator is combined and recycled to the process for use as desorbent. It will be observed from the drawing that the relative quantities of charge and desorbent which are passed through the desorbent during each cycle are such that the charge aromatics are completely desorbed, whereas the desorbent aromatics are never completely desorbed, but appear in the effluent in greater or lesser amounts throughout the cycle.

Such a cyclic adsorption process can be operated almost indefinitely so long as the boiling range of the charge remains constant. If, however, due to operational difficulties or inefficient fractionation, the boiling range of the charge should vary, on occasion it may be found that the charge will conain a component boiling within the boiling range of the desorbent, and of a character such that it will destroy the artomatic-saturate balance of the desorbent. This is particularly true when the charge is a selected cut of motor reformate. For example, the product obtained by catalytically reforming a 250°–400° F. naphtha fraction contains a saturate fraction boiling between 150° F. and 250° F. formed by hydrocracking of higher boiling paraffins. If this fraction should accidentally appear in the charge to the adsorber, it will be partialy recovered along with desorbent in the product fractionation tower, and will dilute the recovered desorbent. If the low boiling saturate fraction constitutes a fairly large proportion of the charge, after only a few cycles of operation the desorbent will contain such a large percentage of saturates that it is no longer capable of functioning efficiently to separate the charge saturates and aromatics. Thus, even though the malfunction of the fractionation apparatus which caused the presence of the low boiling saturate fraction in the charge is only temporary, it is still possible that the entire desorbent inventory may be rendered unfit for use before the malfunction can be corrected.

In the past, when the desorbent has become so diluted with saturate material that its efficiency has been reduced to such a point as to unfit it for commercial use, it has been the practice to discard the desorbent, and make up a fresh batch by blending aromatics and saturates in the desired proportions. The necessary loss of the more expensive aromatic component of the diluted desorbent constitutes a serious economic burden on the process, but, since the aromatics could not be separated from the saturates by fractional distillation, this loss has been considered a burden inherent in the adsorption process.

I have now discovered a method by which such diluted desorbents may be reconstituted for use in an adsorption process, with the attendant production of an essentially aromatic-free saturate product useful as a solvent for insecticides and for other uses in which a light paraffinic solvent is desired. This desirable result may be obtained by increasing the charge/desorbent ratio to a value at which, during each cycle of operation, the desorbent aromatics are completely displaced from the gel by charge components. The effluent may then be divided into two portions, each of which is separately fractionated to yield, from one portion, a fraction containing about 60% aromatics for use as desorbent in subsequent operations, together with a mixture of charge saturates and aromatics; and from the other, a desorbent saturate fraction together with an additional quantity of a mixture of charge saturates and aromatics. The two charge fractions are combined and returned to charge storage for processing when the operation is again returned to normal processing conditions, while the saturate fraction is removed for sale as such, or for such other processing as may be desired.

Figure 2:
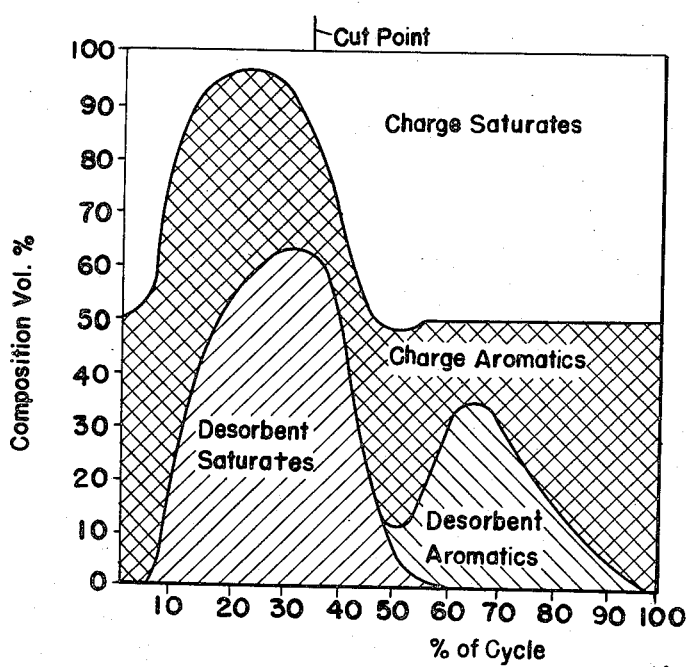

Fig. 2 of the accompanying drawing is an effluent flow diagram illustrating one method of operation in reconstituting desorbent according to the present invention. In this case the desorbent had, during normal operation under the conditions hereinbefore described in connection with Fig. 1, become diluted with a low boiling saturate fraction, which had accidentally appeared in the charge to an extent such that its aromatic content had been reduced to 30%. The flow of desorbent (boiling range 160°–190° F.) to the gel case was then reduced to 0.0496 gallon per pound of gel per cycle, while the flow of charge containing 50% aromatics, and of normal boiling range (300°–400° F.) was increased to 0.13 gallon per pound of gel per cycle. As may be observed from Fig. 2, at these flow rates, the effluent, at the beginning of each cycle consists wholly of charge of normal constitution. As the cycle progresses, desorbent saturates appear in the effluent, rising to a maximum at about 30% of the cycle, and rapidly declining thereafter until they disappear at about 58% of the cycle. Desorbent aromatics begin to appear in the effluent at about 50% of the cycle, rising to a maximum at about 65% thereof and declining thereafter until they disappear at about 98% of the cycle. Now, if the effluent is divided into two portions during each cycle, one of the first 35% of the cycle and the other the last 65% of the cycle, these two portions can be fractionated to yield the following products:

|  | First Portion | | Second Portion | |
| --- | --- | --- | --- | --- |
|  | Percent Total Effluent | Vol. percent Aromatics | Percent Total Effluent | Vol. percent Aromatics |
| Overhead (160–190° F.) | 13.9 | 0 | 13.4 | 61 |
| Bottoms (300–400° F.) | 21.1 | 78 | 51.6 | 39 |

As may be observed, the overhead from the second portion comprises 61% aromatics, and is suited for use as a desorbent without further treatment. The overhead from the first portion constitutes a desirable aromatic-free light solvent, while the bottoms from both portions are blended and sent back to charge storage for further processing as described in connection with Fig. 1.

Alternatively, instead of dividing the effluent into portions such that fractionation will yield directly a composition suitable for use as desorbent, the cut point may be at the point where desorbent aromatics first appear in the effluent. In such a case the overhead from the second portion will contain up to about 95% or more aromatics, and this fraction may be blended with diluted desorbent to raise its aromatic content to the desired level. This method of operation has the advantage that the entire inventory of diluted desorbent need not be treated in order to reconstitute it, but only an amount to yield sufficient aromatics to raise the aromatic content of the total desorbent to the desired level need be processed.

It will be realized that the ratios of desorbent to charge described above are suitable for use in normal operations when the charge contains 50% aromatics and the desorbent contains 60% aromatics; and in reconstituting operations when the charge contains 50% aromatics, and the desorbent contains 30% aromatics, but that the optimum ratios may vary widely with other stocks containing more or less aromatics than the stocks described by way of example. My invention should therefore not be construed as limited to treating charge and desorbent in the ratios mentioned, but should be construed as covering any operation in which a diluted desorbent is reconstituted by adjusting the charge/desorbent ratio to a value such that desorbent aromatics are substantially completely desorbed from the adsorbent during each cycle, to yield an effluent from which a reconstituted desorbent may be recovered by fractional distillation.

Whereas in the foregoing discussion it has been assumed that the plant in which the adsorption process is practiced is equipped with sufficient fractionation capacity to prepare a charge stock which normally boils well outside the boiling range of the desorbent so that desorbent contaminants appear only intermittently in the charge, it may be that the plant does not have sufficient capacity, and that the charge stock may normally contain a small amount of saturates boiling within or near to the boiling range of the desorbent. Formerly it has been considered impracticable to separate such a charge stock into aromatics and saturates by adsorption, due to the desorbent contamination problem. In accordance with my invention, however, such charge stocks may easily be processed by running the operation in normal fashion until the aromatic content of the desorbent has dropped to an uneconomic level. The relative proportions of charge and desorbent are then adjusted to reconstitute the desorbent, and operation is continued until the aromatic content of the entire desorbent inventory has been built back up to its original level, at which time normal operation is resumed. During the reconstitution operation, the presence of saturates in the charge boiling within the desorbent boiling range makes no difference, since these saturates will appear only in the desorbent saturate fraction which is recovered for use as a light paraffinic solvent, and will not contaminate the desorbent aromatic fraction.

The invention claimed is:

1. In a cyclic adsorption process involving successive contact of a charge stock and a desorbent with an adsorbent, said charge stock and desorbent each being composed of aromatic and saturate hydrocarbons, and each normally boiling outside the range of the other, the effluent from the adsorbent being collected in a plurality of portions which are subjected to fractional distillation to recover the desorbent and aromatic and saturate fractions of the charge stock, and wherein the charge stock may occasionally contain a saturate portion boiling within the boiling range of the desorbent, which saturate fraction is recovered with the desorbent in the fractional distillation step whereby to lower the percentage of aromatics in the desorbent and thereby lower its efficiency, the improvement which consists in increasing the ratio of charge stock to desorbent which has become diluted with charge saturates to a value such that the desorbent aromatics are substantially completely displaced from the adsorbent by the charge stock during each cycle of operation, collecting a first portion of effluent from the adsorbent comprising charge stock components and desorbent saturates, collecting a second portion of effluent from the adsorbent comprising charge stock components and desorbent saturates and aromatics in substantially the same proportion as in the desorbent before dilution, subjecting the second portion to fractional distillation and recovering a reconstituted desorbent.

2. A cyclic adsorption process involving successive contact of a charge stock and a desorbent with an adsorbent, said charge stock and desorbent each being composed of aromatic and saturate hydrocarbons, said charge stock boiling largely outside the range of the desorbent, but containing a relatively small proportion of saturates boiling within the boiling range of the desorbent, which process during each cycle comprises passing charge stock in liquid phase through the adsorbent in an amount such that substantially all of its aromatic content is adsorbed, thereafter passing the desorbent in liquid phase through the adsorbent in an amount such as to desorb substantially all of the charge stock aromatics from the adsorbent, diverting successive portions of effluent from the adsorbent during each cycle, one of said portions being enriched in charge saturates and another being enriched in charge aromatics, fractionally distilling each portion to recover a charge aromatic fraction, a charge saturate fraction, and a desorbent fraction progressively enriched in saturates, continuing the operation until the amount of saturates in the desorbent has built up to a point at which the efficiency of the desorbent has declined to a degree such that it is desirable to reconstitute it, then during each cycle passing charge stock in liquid phase through the adsorbent in an increased amount such as to desorb substantially completely all of the desorbent aromatics left on the absorbent from a previous cycle, passing desorbent in liquid phase through the adsorbent in an amount such that substantially all of its aromatic content is adsorbed, diverting successive portions of effluent from the adsorbent during each cycle, one of said portions being enriched in desorbent saturates and another being enriched in desorbent aromatics and fractionally distilling each portion to recover a desorbent saturate fraction, a desorbent fraction enriched in aromatics, and a charge stock fraction.

References Cited in the file of this patent

UNITED STATES PATENTS

| | | |
|---|---|---|
| 2,576,525 | Lipkin | Nov. 27, 1951 |
| 2,621,149 | Scott et al. | Dec. 9, 1952 |